United States Patent [19]

Hongo et al.

[11] Patent Number: 5,029,619
[45] Date of Patent: Jul. 9, 1991

[54] WIRE MONITORING SYSTEM FOR A WIRE HANDLING MACHINE

[75] Inventors: Nobuhisa Hongo, Gumma; Kenji Kanai, Tochigi; Takayuki Maezawa, Gumma, all of Japan

[73] Assignee: Mitsuba Electric Manufacturing Co., Ltd., Gumma, Japan

[21] Appl. No.: 497,224

[22] Filed: Mar. 22, 1990

[30] Foreign Application Priority Data

Mar. 22, 1989 [JP] Japan .................................. 1-70036

[51] Int. Cl.⁵ .............................................. B21F 23/00
[52] U.S. Cl. ........................................ 140/92.2; 72/4; 242/7.05 C
[58] Field of Search ................... 33/734, 735, 736; 192/125 A; 242/7.05 C; 140/93 R, 92.2; 72/3, 4; 83/62

[56] References Cited

U.S. PATENT DOCUMENTS

| | | | |
|---|---|---|---|
| 2,936,525 | 5/1960 | Gollos et al. | 33/734 |
| 3,760,169 | 9/1973 | Paculat | 140/1 |
| 4,070,723 | 1/1978 | Jess et al. | 72/4 |
| 4,307,774 | 1/1983 | Arnold et al. | 140/1 |

FOREIGN PATENT DOCUMENTS 266137 11/1986 Japan ........................................ 72/4

*Primary Examiner*—Lowell A. Larson
*Attorney, Agent, or Firm*—Marshall & Melhorn

[57] ABSTRACT

A monitoring system for a wire handling machine, comprising a measuring unit for measuring an amount of wire consumption by the wire handling machine, and a control unit including memory for storing an expected amount of wire consumption for each of steps carried out by the wire handling machine, and a CPU having the functions of comparing an actual amount of wire consumption as detected by the measuring unit with a corresponding value stored in the memory, and producing an output indicative of a fault in the wire handling machine when any deviation exceeding a certain limit is detected between the actual amount of wire consumption and the corresponding value stored in the memory. Thus, the operating condition of the wire handling machine such as a motor armature coil winding machine can be accurately evaluated by the amount of wire consumption which can be easily measured with a simple device for measurement, for instance by using a rotary encoder coupled with a pulley around which the wire is passed. Furthermore, since a failure in the wire winding machine can be detected as soon as it occurs, a costly system down and waste of coil wire can be minimized by equipping the control unit with an arrangement for stopping the operation of the wire handling machine upon detection of the output indicative of a failure in the wire handling machine.

3 Claims, 1 Drawing Sheet

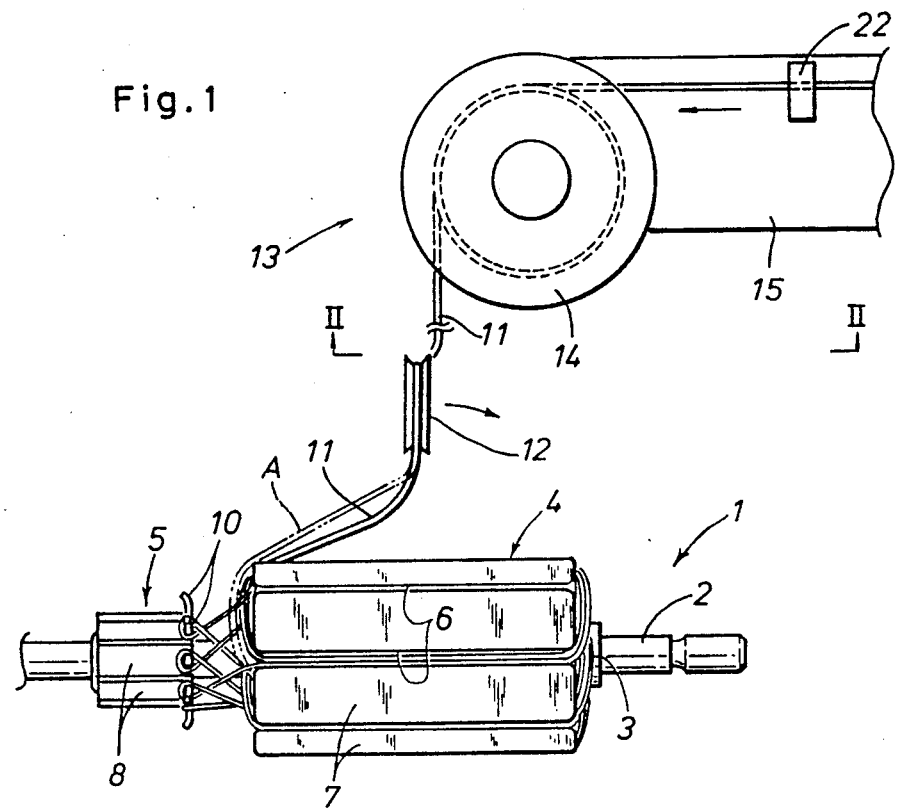
Fig.1
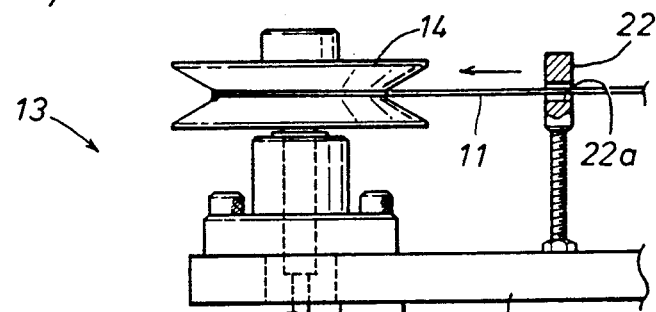
Fig.2
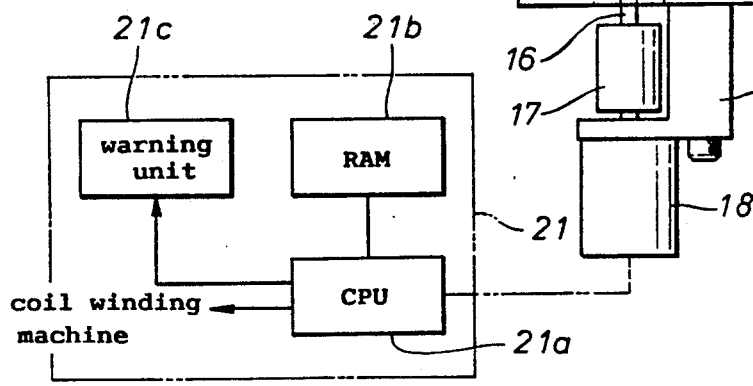

WIRE MONITORING SYSTEM FOR A WIRE HANDLING MACHINE

TECHNICAL FIELD

The present invention relates to a wire monitoring system for a wire handling machine such as a motor armature coil winding machine which can monitor the amount of wire consumption for the purpose of monitoring the operation of the wire handling machine.

BACKGROUND OF THE INVENTION

In a conventional motor armature coil winding machine, a flier is turned around an armature core and coil wire is wound around different core teeth as the armature core is indexed as required. Between the steps of each coil winding operation for each coil as well as at the start and end of the coil winding operation for each armature core, it is necessary to hook the wire around tangs attached to the segments of a commutator. A typical example of such a motor armature coil winding machine is disclosed in U.S. Pat. No. 3,506,864.

In such a coil winding machine, should any failure or error occur to the coil winding operation, for instance a failure to hook the wire around a tang or a failure to pass the wire successfully into a slot between adjacent core teeth, it is desired to stop the operation of the coil winding machine in order to prevent production of a defective armature and to minimize loss of coil wire. When a defective armature is conveyed to a next motor fabrication station without being detected, it could lead to an even more serious failure of the motor fabrication system.

It is therefore desired to monitor the state of coil windings as they are being wound around armature core teeth. Conventionally, it has been monitored by human eyes, and it was not possible to totally eliminate the possibility of overlooking defective motor armatures.

BRIEF SUMMARY OF THE INVENTION

In view of such problems of the prior art, primary object of the present invention is to provide a wire monitoring system which can monitor the state of a coil winding and other handling operation with a simple structure.

A second object of the present invention is to provide a wire monitoring system which is suitable for use with a motor armature coil winding machine to minimize the possibility of producing defective motor armatures.

These and other objects of the present invention can be accomplished by providing: a monitoring system for a wire handling machine, comprising: an input end for receiving wire from a wire source; an output end for feeding the wire to a wire handling machine; means for measuring an amount of wire consumption by the wire handling machine by detecting movement of the wire; and a control unit including data storage means for storing data on an amount of wire consumption for each of steps carried out by the wire handling machine, comparing means for comparing an actual amount of wire consumption as detected by the measuring means with a corresponding value stored in the data storage means, and evaluating means for producing an output indicative of a fault in the wire handling machine when any deviation exceeding a certain limit is detected between the actual amount of wire consumption and the corresponding value stored in the data storage means.

The operating condition of the wire handling machine such as a motor armature coil winding machine can be accurately evaluated by the amount of wire consumption which can be easily measured with a simple device for measurement, for instance by using a rotary encoder coupled with a pulley around which the wire is passed. Furthermore, since a failure in the wire winding machine can be detected as soon as it occurs, a costly system down and waste of coil wire can be minimized by equipping the control unit with means for stopping the wire handling machine upon detection of the output from the evaluating means indicative of a failure in the wire handling machine.

BRIEF DESCRIPTION OF THE DRAWINGS

Now the present invention is described in the following with reference to the appended drawings, in which:

FIG. 1 is a schematic view of a preferred embodiment of the wire monitoring system according to the present invention which is applied to a motor armature coil winding machine; and FIG. 2 is a schematic end view as seen in the direction indicated by arrows II in FIG. 1.

DETAILED DESCRIPTION OF THE PREFERRED EMBODIMENTS

Referring to FIGS. 1 and 2, a preferred embodiment of the monitoring system for a wire handling machine according to the present invention is applied to a motor armature coil winding machine. A motor armature 1 consists of a rotor shaft 2, an insulating sleeve 3 surrounding a middle part of the rotor shaft 2, an armature core 4 formed around the insulating sleeve 3, and a commutator 5 also formed around the insulating sleeve 3 axially spaced from the armature core 4. The armature core 4 consists of a plurality of laminated thin iron plates, and is provided with a plurality of core teeth 7 defined by corresponding axial slots 6. The commutator 5 comprises a plurality of segments 8 which are divided along the circumferential direction and insulated from each other, and each of the segments 8 is provided with a tang 10 at its axial end facing the armature core 4.

Further, as best shown in FIG. 1, copper wire 11 is supplied from a wire source (not shown in the drawing) having appropriate wire tensioning means via a guide pulley 12 to a wire winding machine (not shown in the drawings) which winds the wire 11 around the core teeth 7 and hooks it upon the tangs 10 according to a pre-programmed pattern. A wire monitoring system 13 is arranged between the guide pulley 12 and the wire source to monitor the amount of wire which is used for each step carried out by the wire winding machine as described hereinafter.

Referring to FIG. 2, the wire monitoring system 13 comprises a bracket 15 fixedly secured to the wire winding machine, a pulley 14 which is rotatably supported by the bracket 15 via a rotary shaft 16 and around which the wire 11 is passed by one and a quarter turns, another bracket 19 fixedly secured to the bracket 15, and a rotary encoder 18 fixedly supported by the bracket 19. An input shaft of a rotary encoder 18 is coupled with the pivot shaft 16 of the pulley 14. The output of the rotary encoder 18 is connected to a CPU 21a included in a control unit 21 for controlling the operation of the wire winding machine. The CPU 21a carries out the function of comparing the amount of wire consumption detected by the rotary encoder 28 with each of a set of pre-programmed values stored in RAM 21b associated with the CPU 21. Numeral 22 denotes a wire guide having a wire eye 22a for preventing lateral movement of the wire 11.

The process of winding the wire around the core teeth 7 and hooking the wire around the tangs 10 consists of a plurality of steps and, the expected amount of the wire that is used for each step is stored in the control unit 11. The amount of actual wire consumption in each step can be measured by evaluating the output from the rotary encoder 18. If there is any deviation of the consumed wire from the corresponding value stored the RAM 21b by more than a certain margin of tolerance in any of the steps, it means that the particular step may not have been carried out according to a pre-programmed fashion. For instance, if the wire 11 has failed to be hooked around an intended tang 10 in a hooking step as indicated by the imaginary lines A in FIG. 1, the amount of wire consumption in that particular step falls below the expected value or the value stored in the RAM 21b. This is detected by the CPU 21a of the control unit 21 by comparing the actual output from the rotary encoder 18 with the stored value, and stops the operation of the wire winding machine. Typically, a warning is issued from an audio and/or visual warning unit 21c to the personnel responsible for the maintenance of this and other wire winding machines so that a corrective measure may be taken without any delay. Similarly, if there is any error in winding the coil around the core teeth, it can be detected by the amount of wire consumption detected by the rotary encoder 18.

Although the present invention was described in terms of a specific embodiment, it is possible to effect various modifications and alterations to the invention without departing from the spirit of the invention. For instance, there are many other possible ways of measuring wire consumption other than using a rotary encoder. Also, such means for measuring wire consumption may be incorporated in the guide pulley or other parts of the wire source.

Further, the present invention can be most advantageously applied to motor armature winding machines, but it can be applied to other wire handling machines including coil winding machines for motor stators, and transformer coils, among other possibilities.

What we claim is:

1. A monitoring system for a motor armature winding machine, comprising:

an input end for receiving wire from a wire source;

an output end for feeding said wire to a motor armature winding machine;

means for measuring an amount of wire consumption by said motor armature winding machine by detecting movement of said wire; and a control unit including data storage means for storing data on an amount of wire consumption for each of two or more steps carried out by said motor armature winding machine, comparing means for comparing an actual amount of wire consumption as detected by said measuring means with a corresponding value stored in said data storage means, and evaluating means for producing an output indicative of a fault in said motor armature winding machine when any deviation exceeding a certain limit is detected between said actual amount of wire consumption and said corresponding value stored in said data storage means.

2. A wire monitoring system according to claim 1, wherein said measuring means comprises a rotary encoder coupled with a pulley around which said wire is passed.

3. A wire monitoring system according to claim 1, wherein said control unit is provided with means for stopping said motor armature winding machine upon detection of said output indicative of a failure in said motor armature winding machine.

* * * * *